(12) United States Patent  (10) Patent No.: US 7,333,402 B2
Ishii et al.  (45) Date of Patent: Feb. 19, 2008

(54) MAGNETO-OPTICAL HEAD SUPPORT STRUCTURES

(75) Inventors: Kazuyoshi Ishii, Tokyo (JP); Kazunori Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 608 days.

(21) Appl. No.: 10/760,317

(22) Filed: Jan. 21, 2004

(65) Prior Publication Data

US 2004/0151079 A1 Aug. 5, 2004

(30) Foreign Application Priority Data

Jan. 24, 2003 (JP) .............................. 2003-016345

(51) Int. Cl.
*G11B 11/00* (2006.01)
(52) U.S. Cl. ................................. 369/13.12; 369/13.21
(58) Field of Classification Search ............ 369/13.12, 369/13.11, 13.13, 13.2, 13.21
See application file for complete search history.

(56) References Cited

U.S. PATENT DOCUMENTS

| | | | |
|---|---|---|---|
| 4,756,967 A | 7/1988 | Hashimoto et al. | 428/336 |
| 4,910,068 A | 3/1990 | Takagi et al. | 428/141 |
| 4,913,933 A | 4/1990 | Kasanuki et al. | 427/129 |
| 5,000,995 A | 3/1991 | Kishi et al. | 428/64 |
| 5,055,351 A | 10/1991 | Fujimoto et al. | 428/336 |
| 5,122,998 A * | 6/1992 | Mizuno et al. | 369/13.2 |
| 5,140,938 A | 8/1992 | Kasanuki et al. | 118/718 |
| 5,202,863 A * | 4/1993 | Miyatake et al. | 369/13.2 |
| 5,360,969 A | 11/1994 | Suzuki | 235/479 |
| 5,377,055 A | 12/1994 | Ishii | 360/59 |
| 5,485,433 A | 1/1996 | Satomura et al. | 369/13 |
| 5,523,986 A | 6/1996 | Ishii | 369/13 |
| 5,550,796 A | 8/1996 | Ishii | 369/13 |
| 5,559,763 A | 9/1996 | Ishii | 369/13 |
| 5,563,853 A | 10/1996 | Ishii | 369/13 |
| 5,579,293 A | 11/1996 | Ishii | 369/13 |
| 5,586,091 A | 12/1996 | Ishii et al. | 369/13 |
| 5,615,183 A | 3/1997 | Ishii | 369/13 |
| 5,644,554 A * | 7/1997 | Harada et al. | 369/13.21 |
| 5,661,612 A | 8/1997 | Hasegawa et al. | 360/59 |
| 5,687,141 A | 11/1997 | Ishii | 369/13 |
| 5,689,478 A | 11/1997 | Ishii et al. | 369/13 |
| 5,703,839 A | 12/1997 | Ishii | 369/13 |
| 5,901,015 A * | 5/1999 | Kurita et al. | 369/13.17 |
| 5,986,976 A | 11/1999 | Ishii | 369/13 |
| 5,991,242 A | 11/1999 | Ishii | 369/13 |
| 6,041,024 A | 3/2000 | Ishii | 369/13 |
| 6,044,043 A * | 3/2000 | Aoki et al. | 369/13.2 |
| 6,091,673 A * | 7/2000 | Murakami et al. | 369/13.12 |
| 6,298,015 B1 | 10/2001 | Ishii et al. | 369/13 |

(Continued)

*Primary Examiner*—Tan Dinh
(74) *Attorney, Agent, or Firm*—Fitzpatrick, Cella, Harper & Scinto (57) ABSTRACT

A suspension supporting a magnetic head is formed by a member different in material from gimbals. As a result, the characteristic of the gimbals minimizing electric power loss in supplying current while sufficiently elastically holding the magnetic head can be compatible with the characteristic of suspension suppressing variation and impact from the outside or rotational displacement although both characteristics are different from each other. This allows the displacement of the magnetic head caused by the vibration and the impact from the outside or the horizontal displacement associated with the vertical displacement of a recording medium to be decreased, so that inductance of the magnetic head can be decreased and recording speed can be improved.

4 Claims, 7 Drawing Sheets

U.S. PATENT DOCUMENTS

| | | | |
|---|---|---|---|
| 6,314,060 B1 | 11/2001 | Ishii | 369/13 |
| 6,314,062 B1 * | 11/2001 | Suzuki et al. | 369/13.17 |
| 6,404,705 B1 * | 6/2002 | Watanabe et al. | 369/13.14 |
| 6,466,523 B1 * | 10/2002 | Ishii | 369/13.12 |
| 6,529,448 B1 | 3/2003 | Ishii et al. | 369/13.23 |
| 6,584,045 B1 | 6/2003 | Ishii et al. | 369/13.23 |
| 6,614,731 B2 | 9/2003 | Ishii | 369/13.54 |
| 6,826,130 B2 * | 11/2004 | Kamimura | 369/13.2 |
| 6,909,673 B2 * | 6/2005 | Ishii et al. | 369/13.12 |
| 6,920,087 B2 * | 7/2005 | Sumi et al. | 369/13.12 |
| 7,016,267 B2 * | 3/2006 | Suzuki | 369/13.17 |
| 7,230,798 B2 * | 6/2007 | Hashi et al. | 360/244.2 |
| 2001/0018107 A1 | 8/2001 | Ishii | 428/65.3 |
| 2003/0007428 A1 | 1/2003 | Ishii | 369/13.17 |
| 2003/0058750 A1 | 3/2003 | Suzuki | 369/13.17 |
| 2003/0161220 A1 | 8/2003 | Ishii et al. | 369/13.2 |

* cited by examiner

MAGNETO-OPTICAL HEAD SUPPORT STRUCTURES

BACKGROUND OF THE INVENTION

1. Field of the Invention

The present invention relates to a magneto-optical recording apparatus in which an information signal is recorded in such a manner that an optical head irradiates a magneto-optical recording medium with a light beam at the same time of applying a magnetic field to the magneto-optical recording medium by a magnetic head, particularly relates to a support mechanism for the magnetic head in which the magnetic field modulated by the information signal is applied to the magneto-optical recording medium.

2. Related Background Art

In the past, the magneto-optical recording apparatus adopting a magnetic field modulation method has been practically used in which, at the same time of applying the magnetic field modulated by an information signal to the magneto-optical recording medium having a magneto-optical recording layer by the magnetic head, the optical head irradiates an area to which the magnetic field is applied with the light beam.

Figure 6:
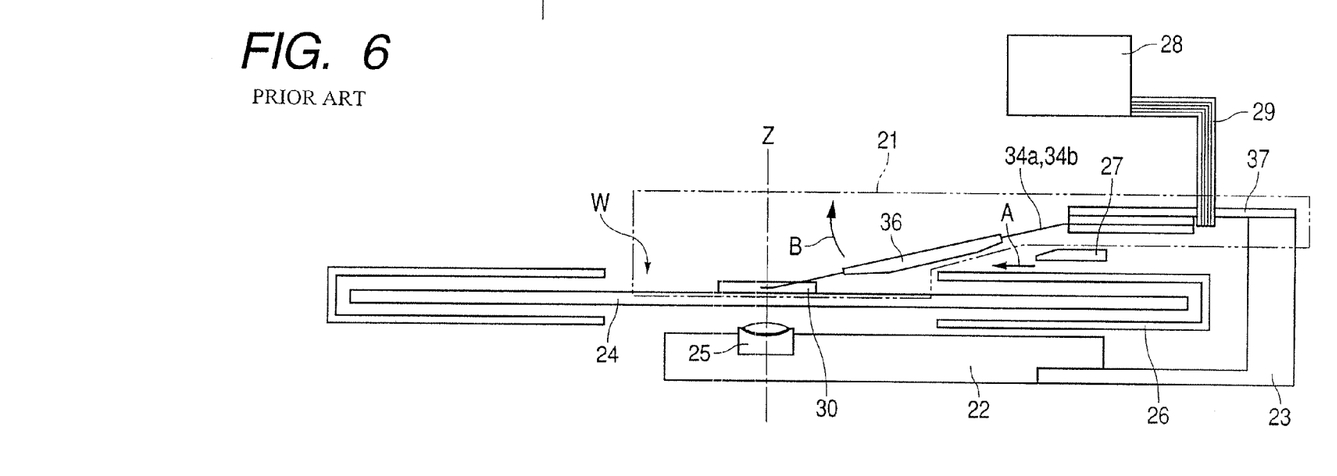
FIG. 6 is a side view showing a schematic configuration of a conventional magneto-optical recording apparatus.

FIG. 6 is a side view showing a schematic configuration of the conventional magneto-optical recording apparatus. In FIG. 6, a reference numeral 21 indicates a magnetic head support mechanism, a reference numeral 22 indicates an optical head, reference numeral 23 indicates a connecting member which connects the magnetic head support mechanism 21 to the optical head 22, and a reference numeral 24 indicates a magneto-optical recording medium.

The optical head 22 is provided with an objective lens 25 for irradiating the magneto-optical recording medium 24 with the light beam. A reference numeral 26 indicates a cartridge which covers the magneto-optical recording medium 24, and an opening W for exposing the magneto-optical recording medium 24 is provided in a part of the cartridge 26.

The magnetic head support mechanism 21 is a support mechanism which supports a magnetic head 30 applying the magnetic field to the magneto-optical recording medium 24. The magnetic head support mechanism 21 includes support members 34a and 34b for holding the magnetic head 30 at front ends of the support members 34a and 34b, a reinforcing member 36, and a holding substrate 37. A reference numeral 27 indicates a driving member which drives the magnetic head support mechanism 21, a reference numeral 28 indicates a magnetic head driving circuit which supplies current to the magnetic head 30, and a reference numeral 29 indicates an electric lead which supplies the current.

Figures 7A, 7B:
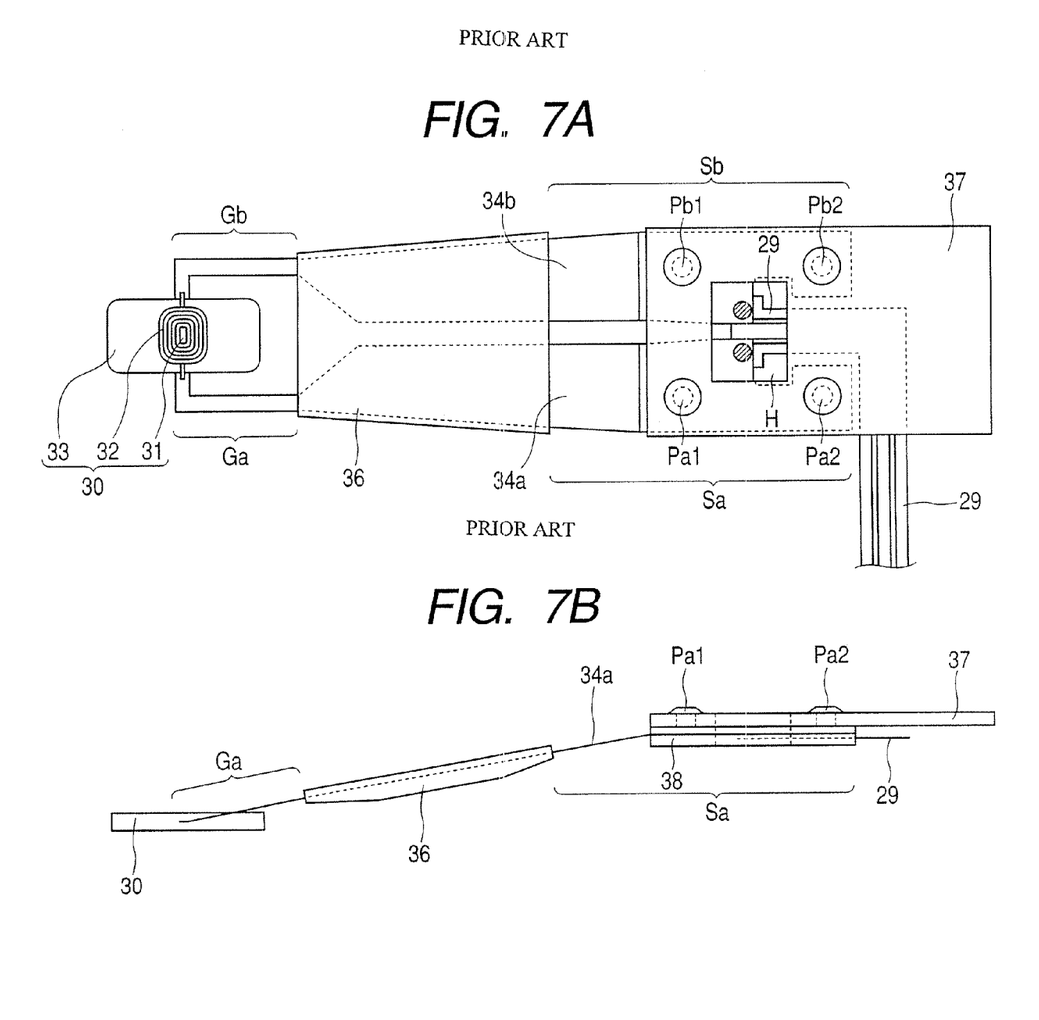
FIGS. 7A and 7B are a top view and a side view showing the configuration of a conventional magnetic head support mechanism, respectively.

FIGS. 7A and 7B show the details of the magnetic head support mechanism 21. FIG. 7A is its top view and FIG. 7B is its side view. The magnetic head 30 includes a core 31, a coil 32 which is provided around the core 31, a slider 33 on which the core 31 and the coil 32 are mounted. The core 31 is made of a magnetic material, and an end face of the core 31 is formed so as to be opposite to the magneto-optical recording medium 24. The slider 33 is made of such a material as resin and ceramic having lubricity.

The pair of support members 34a and 34b is attached to the gimbals Ga and Gb for holding the magnetic head 30 at their front ends and the holding substrate 37 to form suspensions Sa and Sb which hold the gimbals Ga and Gb together with the magnetic head 30. A reinforcing member 36 is attached at an intermediate position between the holding substrate 37 and the gimbals Ga and Gb. Each of the support members 34a and 34b is formed by a single thin plate made of, for example, phosphor bronze or beryllium copper having elasticity, the gimbals Ga and Gb have a width ranging from 0.2 to 0.5 mm, and the suspensions Sa and Sb have the width ranging from 2 to 5 mm. The reinforcing member 36 is made of a resin material, and the holding substrate 37 is made of stainless steel.

The gimbals Ga and Gb are electrically connected to both ends of the coil 32 in the magnetic head 30 respectively, and the suspensions Sa and Sb are electrically connected to the electric leads 29 at an exposed portion of a square hole H formed in the holding substrate 37 respectively. As described later, since the support members 34a and 34b form a current supply path which supplies the current to the coil 32 in the magnetic head 30, electric resistivity of the support members 34a and 34b is small, and the support members 34a and 34b are formed by an integrated member made of a copper alloy which is easily connected by soldering.

At this point, the connection of the suspensions Sa and Sb to the holding substrate 37 should be quite strong, and both are electrically insulated from each other. Therefore, in a region for attaching the suspensions Sa and Sb, an insulating member 38 made of a resin material is integrally formed with upper side projections Pa1, Pa2, Pb1, and Pb2 so as to sandwich the suspensions Sa and Sb in the insulating member to cover the upper and lower surfaces of the suspensions with the insulating member. Holes are made in the holding substrate 37. After the projections Pa1, Pa2, Pb1, and Pb2 of the insulating member 38 are fitted into the holes in the holding substrate 37, portions upwardly projected from the holding substrate 37 are melted and attached to the upper surface of the holding substrate 37.

As shown in FIG. 6, the suspensions Sa and Sb are downwardly bended toward the opening W in the cartridge 26 at the position where the suspensions Sa and Sb are attached to the holding substrate 37, energization force of the bending causes the magnetic head 30 to load (press) onto the magneto-optical recording medium 24 within the opening W. The magnetic head 30 is unloaded (retracted) from the magneto-optical recording medium 24 by slidingly driving the driving member 27 in a direction shown by an arrow A, and abutting on the reinforcing member 36 to lift the reinforcing member 36, elastically deforming the suspensions Sa and Sb, and rotating the magnetic head support mechanism 21 as shown by an arrow B.

In the opening W of the cartridge 26, the optical head 22 is arranged on the lower surface side of the magneto-optical recording medium 24, and the magnetic head 30 is loaded (pressed) to the upper surface side of the magneto-optical recording medium 24 while the magnetic head 30 is opposite to the optical head 22. At this point, the magnetic head support mechanism 21 is downwardly tilted toward the inside of the opening W from a position above the upper surface of the cartridge 26. The positions of the magnetic head 30 and the optical head 22 are aligned and connected so that the center of the end face of the core 31 which is of the magnetic field generating portion is located on an optical axis Z of the objective lens 25 in the optical head 22 (at the position of a spot of the light beam formed on the magneto-optical recording medium 24).

The current from the magnetic head driving circuit 28 is supplied to the coil 32 in the magnetic head 30 through the electric lead 29, the suspensions Sa and Sb, and the gimbals Ga and Gb. When the support members 34a and 34b themselves of the magnetic head 30 are used as the current supply path, it is not necessary to provide and fix the electric leads along the gimbals Ga and Gb or to directly connect the electric leads to the magnetic head 30. Accordingly, rigidity of the electric leads 29 does not adversely affect mechanical characteristics of the support members 34a and 34b, particularly the gimbals Ga and Gb, and it is also easy to realize manufacture thereof.

In recent years, it is necessary to increase modulation frequency of the magnetic field, as recording speed of the information signal is improved. Therefore, there is a trend to decrease inductance by decreasing an area of the end face (magnetic field generating portion) of the core 31 in the magnetic head 30 opposite to the magneto-optical recording medium 24. At this point, since the area to which the magnetic field is applied is also decreased, higher accuracy of position is required between the magnetic field applied area and the spot of the light beam which the optical head 22 forms.

However, by vibration or impact which is applied to the magneto-optical recording apparatus from the outside, the magnetic head 30 is displaced in a direction parallel to the magneto-optical recording medium 24 in a state that the magnetic head 30 is loaded.

Further, since the support members 34a and 34b holding the magnetic head 30 have the shape which is downwardly tilted toward the inside of the opening W from a position above the upper surface of the cartridge 26, the magnetic head 30 is displaced not only in the vertical direction but also in the horizontal direction relative to the magneto-optical recording medium 24 by fluctuation in height of the surface of the magneto-optical recording medium 24 or surface run-out associated with rotation.

Figure 8:
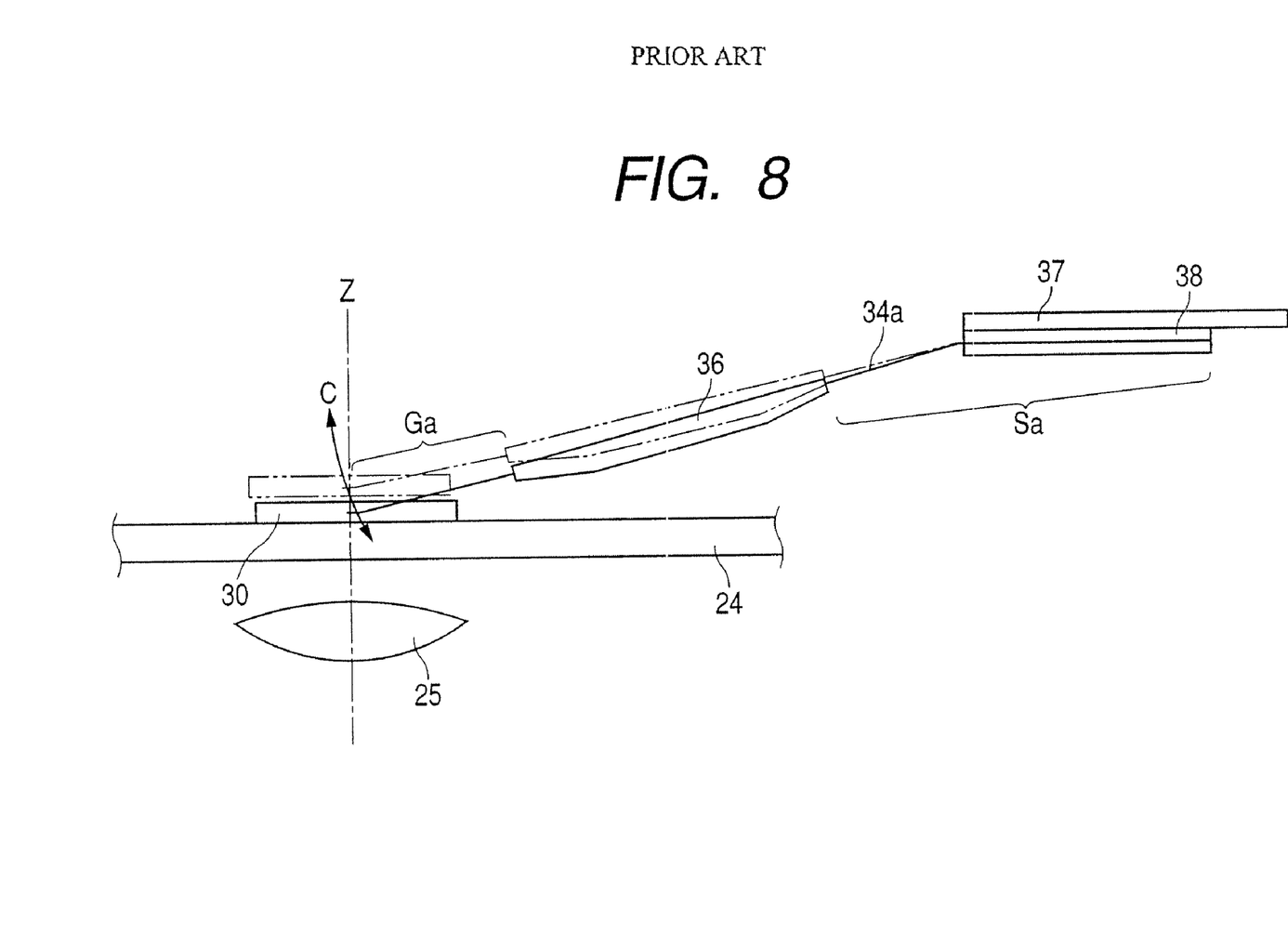
FIG. 8 is a side view illustrating a problem of the conventional magnetic head support mechanism.

The above-described action will be described referring to FIG. 8. In FIG. 8, the position of each member displaced upwardly from the position shown by solid lines is shown by alternate long and short dashed lines. When the surface of the magneto-optical recording medium 24 is displaced in the vertical direction, the overall support members 34a and 34b generate rotational displacement about the position for attaching the suspensions Sa and Sb, which results in the arc displacement of the magnetic head 30 as shown by an arrow C.

The horizontal displacement associated with the rotational displacement is proportional to the magnitude of the tilt of the support members 34a and 34b relative to the magneto-optical recording medium 24. However, there is limitation in a manner that the tilt angle of the support members 34a and 34b is decreased, by arranging the support members 34a and 34b so as to be downwardly tilted toward the opening W from a position above the upper surface of the cartridge 26. Since the gimbals Ga and Gb and the suspensions Sa and Sb are made of a single member, it is difficult that the characteristic of the gimbals Ga and Gb sufficiently elastically holding the magnetic head 30 is compatible with the characteristic of the suspensions Sa and Sb suppressing the rotational displacement because both characteristics are different from each other.

The end face of the core 31 is also displaced relative to the optical axis Z of the objective lens 25 in the optical head 22 by the displacement caused by the vibration or the impact of the magnetic head 30 or the horizontal displacement of the support members 34a and 34b associated with their rotational displacement. Therefore, even if these displacements are generated, the magnetic field applied area must have a sufficiently wide area including the estimated amount of displacement so that the spot of the light beam is formed within the magnetic field applied area.

Usually, a size of the magnetic field applied area is approximately equal to the size of the end face of the core 31 in the magnetic head 30. That is to say, since the lower limit of the size of the end face of the core 31 is determined by the amount of horizontal displacement of the magnetic head 30, the inductance of the magnetic head 30 can not be sufficiently decreased. This results in a stumbling block for improvement of the recording speed of the information signal.

Since the support members 34a and 34b also have a function of the current supply path to the magnetic head 30, each electric resistivity of the support members 34a and 34b is small and the support members 34a and 34b are formed by the integrated member made of the copper alloy which is easily connected by soldering. However, the electric insulation is required by attaching the support members 34a and 34b via the insulating member 38 to the holding substrate 37 made of the metal material. The provision of the insulating member 38 becomes a problem for miniaturization, because the height in the magnetic head support mechanism is increased. Since the height in position for attaching the suspensions Sa and Sb is also increased, the tilt of the support members 34a and 34b is also increased. As a result, there is a problem that the horizontal displacement of the magnetic head 30 associated with the rotational displacement is increased more and more.

SUMMARY OF THE INVENTION

The invention provides a magnetic head support mechanism having good characteristics, compared with the conventional configuration.

A magnetic head support mechanism of the invention includes a magnetic head, gimbals for electrically connecting to the magnetic head, the gimbals forming a current supply path, and a suspension holding the gimbals, the suspension being made of a member having rigidity higher than that of the gimbals, wherein the suspension performs load (press)/unload (retract) operation of the magnetic head on a recording medium by elastic deformation of the suspension.

DETAILED DESCRIPTION OF THE PREFERRED EMBODIMENTS

Referring to the accompanying drawings, preferred embodiments of the present invention will be described in detail below.

First Embodiment

Figure 1:
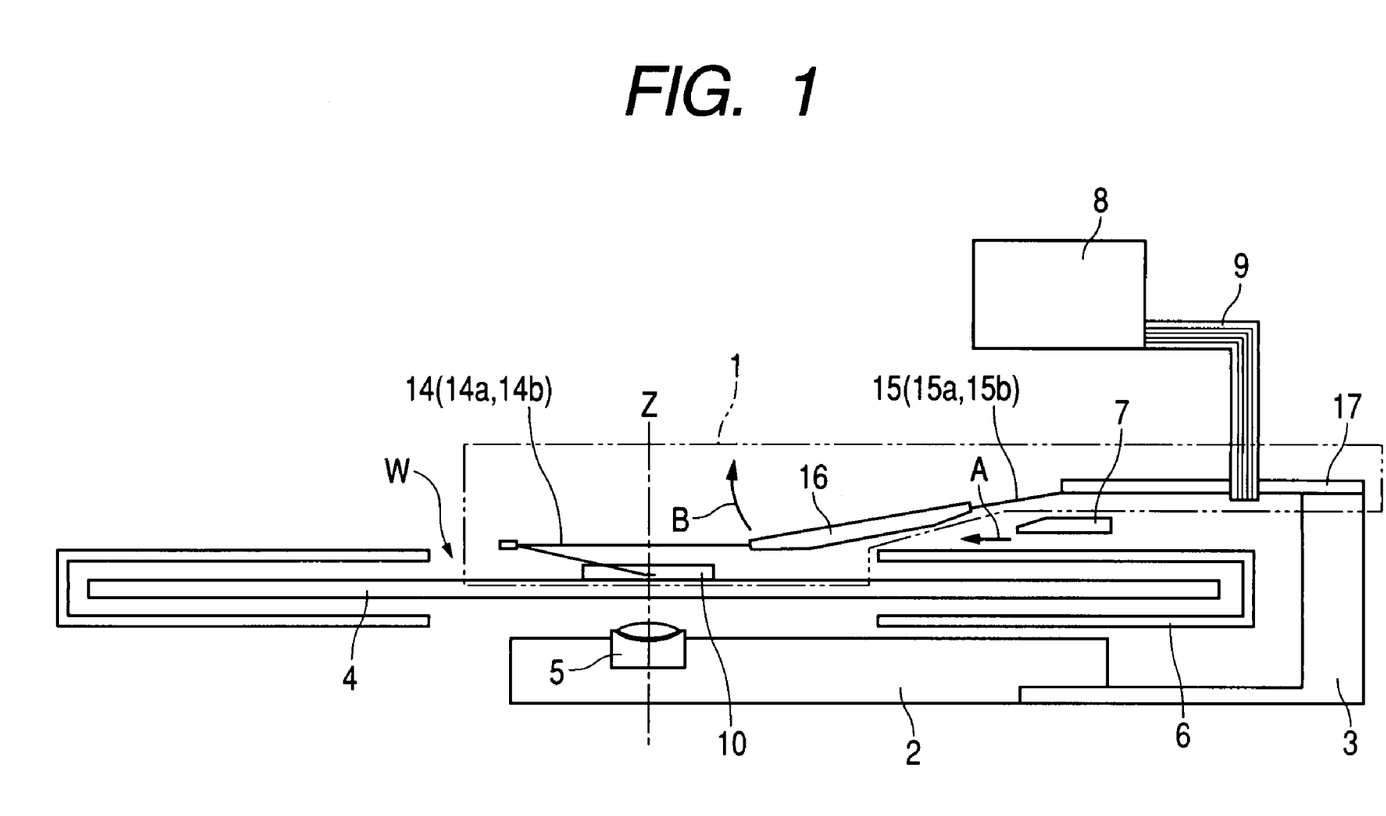
FIG. 1 is a side view showing a first embodiment of the present invention.

FIG. 1 is a side view showing a first embodiment of the present invention. In FIG. 1, a reference numeral 1 indicates a magnetic head support mechanism, a reference numeral 2 indicates an optical head, a reference numeral 3 indicates a connecting member which connects the magnetic head support mechanism 1 and the optical head 2, and a reference numeral 4 indicates a magneto-optical recording medium.

The optical head 2 is provided with an objective lens 5 for irradiating the magneto-optical recording medium 4 with light beam. A reference numeral 6 indicates a cartridge which covers the magneto-optical recording medium 4, and an opening W for exposing the magneto-optical recording medium 4 is provided in a part of the cartridge 6.

The magnetic head support mechanism 1 supports a magnetic head 10 which applies a magnetic field to the magneto-optical recording medium 4. The magnetic head support mechanism 1 includes gimbals 14 (14a, 14b) which holds the magnetic head 10, a reinforcing member 16, a suspension 15 (15a, 15b), and a holding substrate 17. A reference numeral 7 indicates a driving member for driving the magnetic head support mechanism 1, a reference numeral 8 indicates a magnetic head driving circuit for supplying current to the magnetic head 10, and a reference numeral 9 indicates a flexible electric lead (printed wiring board) for supplying the current.

Figure 2A:
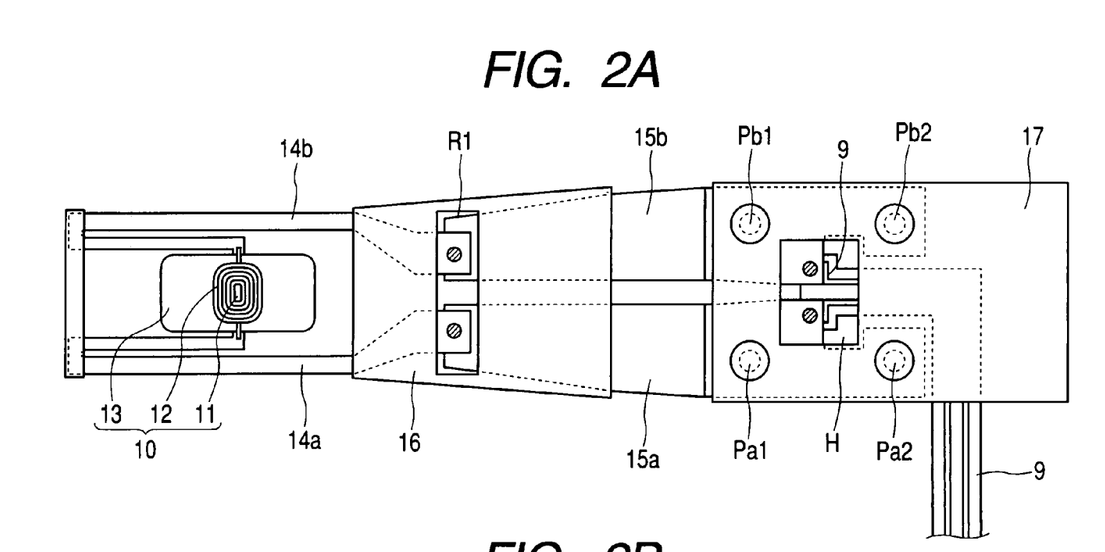
FIGS. 2A and 2B are a top view and a side view showing a magnetic head support mechanism of the first embodiment, respectively.
Figure 2B:
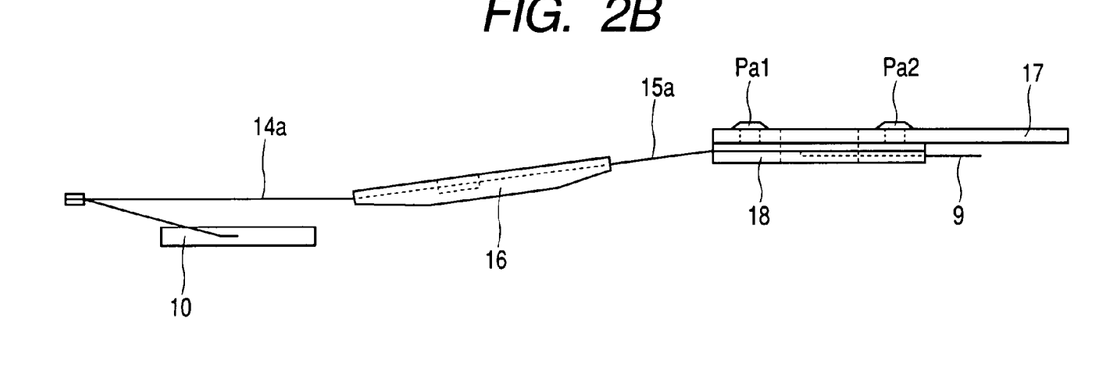

FIGS. 2A and 2B show the details of the magnetic head support mechanism 1. FIG. 2A is its top view and FIG. 2B is its side view. The magnetic head 10 includes a core 11, a coil 12 provided around the core 11, a slider 13 on which the core 11 and the coil 12 are mounted. The core 11 is made of a magnetic material, and the end face of the core 11 is formed so as to be opposite to the magneto-optical recording medium 4. The slider 13 is made of a material, such as resin and ceramic, having lubricity.

The magnetic head 10 is held at front ends of the pair of gimbals 14a and 14b, the gimbals 14a and 14b and the magnetic head 10 are held by the pair of suspensions 15a and 15b, and the suspensions 15a and 15b are attached to the holding substrate 17. Connecting portions between the gimbals 14a and 14b and the suspensions 15a and 15b are reinforced by the reinforcing member 16. The magnetic head support mechanism 1 is connected to the optical head 2 by attaching the holding substrate 17 to the connecting member 3.

For example, each of the gimbals 14a and 14b is a U-shaped thin plate having a thickness ranging from 30 to 50 μm and a width ranging from 0.2 to 0.6 mm, and the gimbals 14a and 14b are made of phosphor bronze or beryllium copper having elasticity. For example, each of the suspensions 15a and 15b is a U-shaped thin plate having a thickness ranging from 40 to 70 μm and a width ranging from 2 to 6 mm. The suspensions 15a and 15b are made of phosphor bronze or beryllium copper having elasticity, and the holding substrate 17 is made of stainless steel. The reinforcing member 16 is made of a resin material and formed by inserting the gimbals 14a and 14b and the suspensions 15a and 15b into the resin material and molding it.

The gimbals 14a and 14b are electrically connected to both ends of the coil 12 in the magnetic head 10 respectively, and the suspensions 15a and 15b are electrically connected to the electric leads 9 at an exposed portion of a square hole H formed in the holding substrate 17 respectively. The gimbals 14a and 14b and the suspensions 15a and 15b are electrically connected at the exposed portion of a concave part R1 formed in the reinforcing member 16 respectively, and the gimbals 14a and 14b and the suspensions 15a and 15b constitute a current supply path for supplying the current to the coil 12 in the magnetic head 10 as described later.

At this point, the connection of the suspensions 15a and 15b to the holding substrate 17 should be quite strong and both are electrically insulated from each other. Therefore, in the region for attaching the suspensions 15a and 15b, an insulating member 18 made of a resin material is integrally formed with upper side projections Pa1, Pa2, Pb1, and Pb2 so as to sandwich the suspensions 15a and 15b in the insulating member to cover the upper and lower surfaces of the suspensions with the insulating member. Holes are made in the holding substrate 17. After the projections Pa1, Pa2, Pb1, and Pb2 of the insulating member 18 are fitted into the holes in the holding substrate 17, the suspensions 15a and 15b are fixed to the holding substrate 17 while the suspensions 15a and 15b are insulated from the holding substrate 17 in such a manner that portions upwardly projected from the holding substrate 17 are melted and attached to the upper surface of the holding substrate 17.

As shown in FIG. 1, the suspensions 15a and 15b are downwardly bended toward the opening W in the cartridge 6 at the position where the suspensions 15a and 15b are attached to the holding substrate 17, the energization force of the bending causes the magnetic head 10 to load (press) onto the magneto-optical recording medium 4 within the opening W. The magnetic head 10 is unloaded (retracted) from the magneto-optical recording medium 4 in such a manner that the driving member 7 is slidingly driven in a direction shown by an arrow A and abutted on the reinforcing member 16 to lift the reinforcing member 16, the suspensions 15a and 15b are elastically deformed, and the magnetic head support mechanism 1 is rotated as shown by an arrow B.

In the opening W of the cartridge 6, the optical head 2 is arranged on the lower surface side of the magneto-optical recording medium 4, and the magnetic head 10 is loaded (pressed) to the upper surface side of the magneto-optical recording medium 4 while the magnetic head 10 is opposite to the optical head 2. At this point, the magnetic head support mechanism 1 is downwardly tilted toward the inside of the opening W from a position above the upper surface of the cartridge 6. The relative positions of the magnetic head support mechanism 1 and the optical head 2 are adjusted so that the center of the end face of the core 11 which is a magnetic field generating portion is located on the optical axis Z of the objective lens 5 in the optical head 2 (at the position of a light beam spot formed on the magneto-optical recording medium 4), and in this state the mechanism 1 and the head 2 are connected by the connecting member 3.

The current from the magnetic head driving circuit 8 is supplied to the coil 12 in the magnetic head 10 through the electric leads 9, the suspensions 15a and 15b, and the gimbals 14a and 14b. When the support members themselves of the magnetic head 10 are used as the current supply path, it is not necessary to provide and fix the electric leads along the gimbals 14a and 14b or to directly connect the electric leads to the magnetic head 10. Accordingly, the rigidity of the electric leads 9 does not adversely affects mechanical characteristics of the support members, particularly the gimbals 14a and 14b. Even when the gimbals 14a and 14b have the narrow width and the U-shape, it is easy to stably realize the desired minute mechanical characteristics, and it is also easy to realize its manufacture.

By forming the gimbals 14a and 14b with the thin and narrow member, the magnetic head 10 is elastically held sufficiently in the vertical direction. The horizontal displacement of the magnetic head 10 associated with the vertical displacement of the magnetic head 10 is suppressed to a minimum by a method in which the tilt amount of the gimbals 14a and 14b is sufficiently decreased relative to the magneto-optical recording medium 4. The vertical displacement of the magnetic head 10 is generated by the fluctuation in height of the surface of the magneto-optical recording medium 4, the surface runout of the magneto-optical recording medium 4, or the like. The U-shaped folded portion having the reverse tilt can be also caused to have an effect of further decreasing the horizontal displacement generated by a whole of the support members in such a manner that the folded portion has the function of canceling the horizontal displacement associated with the rotational displacement generated by a forward portion or the suspensions 15a and 15b.

By forming the suspensions 15a and 15b with the member thicker and wider than the gimbals 14a and 14b, the rigidity higher than the gimbals 14a and 14b can be given to the suspensions 15a and 15b. As a result, the deformation hardly occurs against vibration and impact applied to the magneto-optical recording apparatus from the outside or the displacement of the magneto-optical recording medium 4, and the rotational displacement of the support members which is the cause of the horizontal displacement of the magnetic head 10 can be suppressed.

Figure 5:
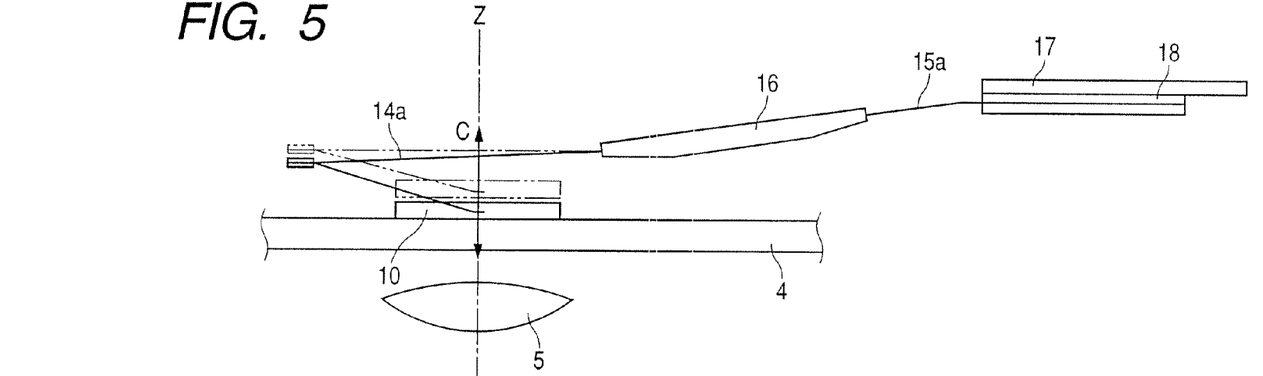
FIG. 5 is a side view illustrating the advantage and effect of the magnetic head support mechanism according to the present invention.

The above-described action will be described referring to FIG. 5. In FIG. 5, the position of each member displaced upwardly from the position shown by solid lines is shown by alternate long and short dashed lines. When the surface of the magneto-optical recording medium 4 is displaced in the vertical direction, the deformation of the suspensions 15a and 15b is very small, and, as shown by an arrow C, the magnetic head 10 is displaced in the vertical direction by the main deformation of the gimbals 14a and 14b. Accordingly, the end face of the core 11 is never shifted from the optical axis Z of the objective lens 5.

As described above, the characteristic of the gimbals 14a and 14b sufficiently elastically holding the magnetic head 10 can be compatible with the characteristic of the suspensions 15a and 15b suppressing the rotational displacement, although both characteristics are different from each other, by forming the gimbals 14a and 14b with a different member from the suspensions 15a and 15b and differentiating the gimbals from suspensions in rigidity (thickness) according to each required characteristic.

Second Embodiment

A second embodiment of the present invention will be described below. In the second embodiment, since the overall configuration of the magneto-optical recording apparatus is the same as the first embodiment, the description will be omitted, and only the magnetic head support mechanism 1 having the feature will be described.

Figure 3A:
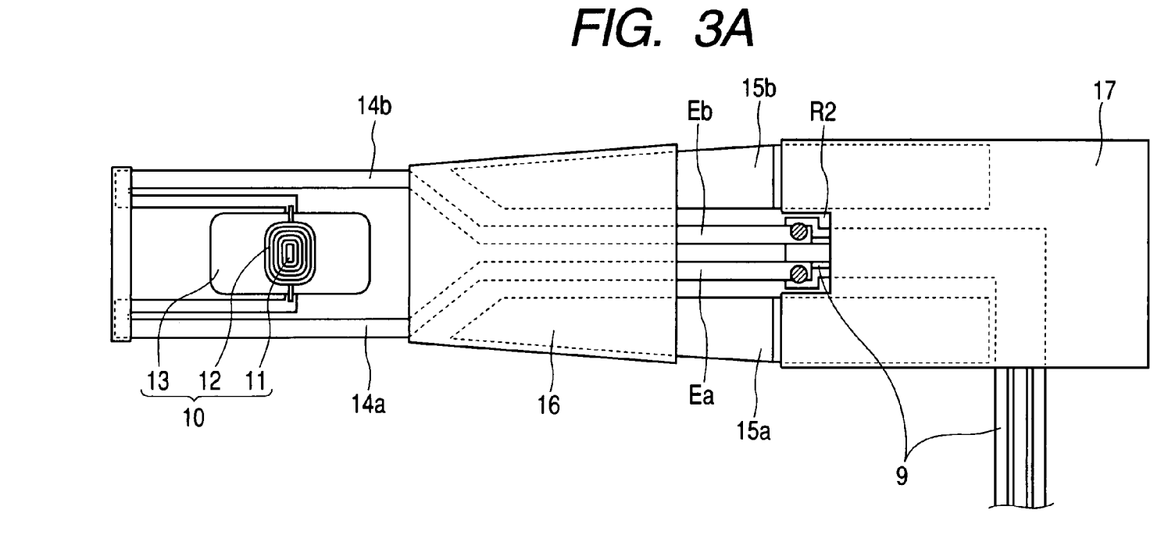
FIGS. 3A and 3B are a top view and a side view showing a second embodiment of the present invention, respectively.
Figure 3B:
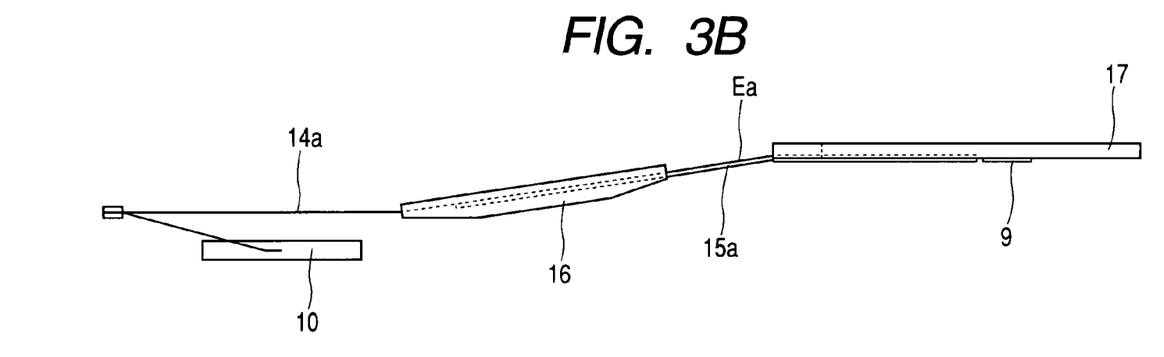

FIGS. 3A and 3B show the details of the magnetic head support mechanism 1 of the second embodiment. FIG. 3A is its top view and FIG. 3B is its side view. The magnetic head 10 includes the core 11, the coil 12 which is provided around the core 11, the slider 13 on which the core 11 and the coil 12 are mounted. The core 11 is made of a magnetic material, and the end face of the core 11 is formed so as to be opposite to the magneto-optical recording medium 4. The slider 13 is made of such a material as resin and ceramic having lubricity.

The magnetic head 10 is held at front ends of the pair of gimbals 14a and 14b, the gimbals 14a and 14b are held with the magnetic head 10 by the pair of suspensions 15a and 15b, and the suspensions 15a and 15b are attached to the holding substrate 17. The gimbals 14a and 14b and the suspensions 15a and 15b are connected to be reinforced by the reinforcing member 16 while the gimbals 14a and 14b and the suspensions 15a and 15b are electrically insulated from each other. The magnetic head support mechanism 1 is connected to the optical head 2 by attaching the holding substrate 17 to the connecting member 3.

For example, each of the gimbals 14a and 14b is a U-shaped thin plate having a thickness ranging from 30 to 50 μm and a width ranging from 0.2 to 0.6 mm, and the gimbals 14a and 14b are made of phosphor bronze or beryllium copper having the elasticity. For example, each of the suspensions 15a and 15b is a U-shaped thin plate having a thickness ranging from 40 to 70 μm and a width ranging from 2 to 6 mm. The suspensions 15a and 15b are made of stainless steel having the elasticity, and the holding substrate 17 is made of stainless steel. The reinforcing member 16 is made of a resin material, and formed by inserting the gimbals 14a and 14b and the suspensions 15a and 15b into the resin material and molding it.

One end of each of the gimbals 14a and 14b is electrically connected to both ends of the coil 12 in the magnetic head 10, respectively. Extended portions Ea and Eb are formed on the other end side of each of the gimbals 14a and 14b, the extended portions Ea and Eb are extended to the holding substrate 17 through a space between the suspensions 15a and 15b, and the front ends of the extended portions Ea and Eb are electrically connected to the electric leads 9 at a concave notch R2 formed in the holding substrate 17 respectively. The extended portions Ea and Eb of the gimbals 14a and 14b and the suspensions 15a and 15b are electrically insulated by providing the sufficient space between the extended portions Ea and Eb and the suspensions 15a and 15b.

In the present embodiment, the gimbals 14a and 14b constitute the current supply path for supplying the current to the coil 12 in the magnetic head 10, while the suspensions 15a and 15b do not constitute the current supply path.

At this point, the connection of the suspensions 15a and 15b to the holding substrate 17 should be quite strong, and its manufacture should be also easy. Therefore, the suspensions 15a and 15b come into close contact with the lower surface of the holding substrate 17, and the suspensions 15a and 15b are integrally contacted to the holding substrate 17 by spot welding. Alternately, the connection may be performed by contact bonding such as caulking. Since it is not necessary that the suspensions 15a and 15b are electrically insulated from the holding substrate 17, unlike the first embodiment, the insulating member is not required. In the connecting portion between the extended portions Ea and Eb of the gimbals 14a and 14b and the electric leads 9, the electrical contact can be prevented only by a change in form such as the formation of the concave cutout in the holding member 17.

As shown in FIG. 1, the suspensions 15a and 15b are downwardly bended toward the opening W in the cartridge 6 at the position where the suspensions 15a and 15b are attached to the holding substrate 17, and the energization force of the bending causes the magnetic head 10 to load (press) onto the magneto-optical recording medium 4 within the opening W. The magnetic head 10 is unloaded (retracted) from the magneto-optical recording medium 4 in such a manner that the driving member 7 is slidingly driven in a direction shown by the arrow A and abutted on the reinforcing member 16 to lift the reinforcing member 16, the suspensions 15a and 15b are elastically deformed, and the magnetic head support mechanism 1 is rotated as shown by the arrow B.

In the opening W of the cartridge 6, the optical head 2 is arranged on the lower surface side of the magneto-optical recording medium 4, and the magnetic head 10 is loaded (pressed) to the upper surface side of the magneto-optical recording medium 4 while the magnetic head 10 is opposite to the optical head 2. At this point, the magnetic head support mechanism 1 is downwardly tilted toward the inside of the opening W from a position above the upper surface of the cartridge 6. The relative positions of the magnetic head support mechanism 1 and the optical head 2 are adjusted so that the center of the end face of the core 11 which is a magnetic field generating portion is located on the optical axis Z of the objective lens 5 in the optical head 2 (at the position of the light beam spot formed on the magneto-optical recording medium 4), and in this state the mechanism 1 and the head 2 are connected by the connecting member 3.

The current from the magnetic head driving circuit 8 is supplied to the coil 12 in the magnetic head 10 through the electric lead 9, the suspensions 15a and 15b, and the gimbals 14a and 14b. When the support members themselves of the magnetic head 10 are used as the current supply path, it is not necessary to provide and fix the electric leads along the gimbals 14a and 14b or to directly connect the electric leads to the magnetic head 10. Accordingly, the rigidity of the electric leads 9 does not adversely affects mechanical characteristics of the support members, particularly the gimbals 14a and 14b. Even when the gimbals 14a and 14b have the narrow width and the U-shape, it is easy to stably realize the desired minute mechanical characteristics, and it is also easy to realize its manufacture.

By forming the gimbals 14a and 14b with a thin and narrow member, the magnetic head 10 is elastically held sufficiently in the vertical direction. The horizontal displacement of the magnetic head 10 associated with vertical displacement of the magnetic head 10 is suppressed to a minimum by the method in which the tilt amount of the gimbals 14a and 14b is sufficiently decreased relative to the magneto-optical recording medium 4. The vertical displacement of the magnetic head 10 is generated by the fluctuation in height of the surface of the magneto-optical recording medium 4, the surface runout of the magneto-optical recording medium 4, or the like.

The U-shaped folded portion having the reverse tilt can be also caused to have an effect of further decreasing the horizontal displacement generated by a whole of the support members in such a manner that the folded portion has a function of canceling the horizontal displacement associated with the rotational displacement generated by a forward portion or the suspensions 15a and 15b. Since the gimbals 14a and 14b have also the function of the current supply path to the coil 12, it is suitable that the gimbals 14a and 14b are made of a copper alloy having low electric resistivity, particularly phosphor bronze or beryllium copper. Such a material can be soldered to the coil 12 or the electric lead 9, so that productivity is good.

By forming the suspensions 15a and 15b with a member thicker and wider than the gimbals 14a and 14b, the rigidity higher than the gimbals 14a and 14b can be given to the suspensions 15a and 15b. As a result, the deformation hardly occurs against vibration and impact applied to the magneto-optical recording apparatus from the outside or the displacement of the magneto-optical recording medium 4, and the rotational displacement of the support members which is the cause of the horizontal displacement of the magnetic head 10 can be suppressed. Therefore, in particular it is desirable that the suspensions 15a and 15b are made of stainless steel or spring steel having mechanical strength (tensile strength) superior to the copper alloy forming the gimbals 14a and 14b, the suspensions 15a and 15b and the holding substrate 17 can be fixedly connected to each other by the spot welding by making the holding substrate 17 of the same material as or the material similar to the material of the suspensions 15a and 15b.

Although, the stainless steel or the spring steel has the electric resistivity higher than that of the copper alloy constituting the gimbals 14a and 14b, and the soldering can not be performed, there is no problem, because the suspensions 15a and 15b do not form the current supply path to the coil 12. The connection may be performed by the contact bonding such as the caulking, when the suspensions 15a and 15b differ from the holding substrate 17 in the composition of the constituent material and the spot welding can not be performed.

In the present embodiment, the extended portions Ea and Eb of the gimbals 14a and 14b are also arranged in parallel to the suspensions 15a and 15b between the reinforcing member 16 and the holding substrate 17. The width and thickness of this portion are smaller than those of the suspensions 15a and 15b, so that the mechanical strength is also small. However, since the extended portions Ea and Eb function as only the current supply path and the suspensions 15a and 15b have the function of the mechanical support, there is generated no problem.

As described above, the characteristic of the gimbals 14a and 14b minimizing electric power loss in the current supply while sufficiently elastically holding the magnetic head 10 can be compatible with the characteristic of the suspensions 15a and 15b suppressing the displacement due to vibration and impact applied from the outside and the rotational displacement, although both characteristics are different from each other, by forming the gimbals 14a and 14b with a different member from the suspensions 15a and 15b and differentiating the gimbals form the suspensions in rigidity (thickness and constituent material) according to each required characteristic. As a result, the horizontal displacement of the magnetic head 10 associated with the displacement in the vertical direction can be sufficiently decreased, similarly to the action of the first embodiment described in FIG. 5.

In the present embodiment, since the insulating member holding the upper and lower surfaces of the suspensions 15a and 15b is not required, a height in the mechanism can be decreased. Further, when the height itself (position of flexed portion) for attaching the suspensions 15a and 15b is decreased, the tilt of the suspensions 15a and 15b is decreased, so that the horizontal displacement of the magnetic head 10 associated with the rotational displacement can be further decreased.

Third Embodiment

A third embodiment of the present invention will be described below. In the third embodiment, since the overall configuration of the magneto-optical recording apparatus is the same as the first embodiment, the description will be omitted, and only the magnetic head support mechanism 1 having the feature will be described.

Figure 4A:
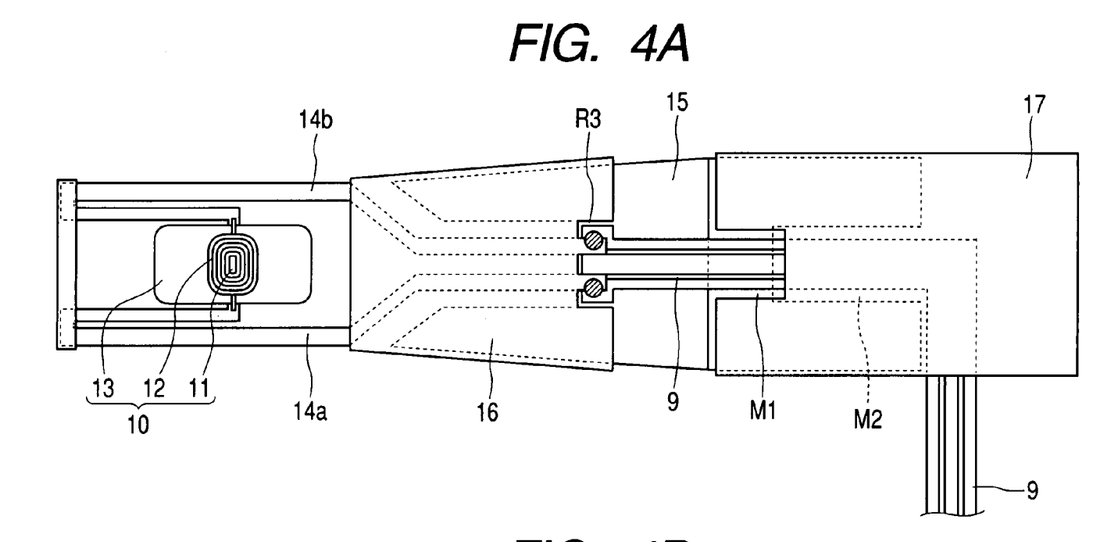
FIGS. 4A and 4B are a top view and a side view showing a third embodiment of the present invention, respectively.
Figure 4B:
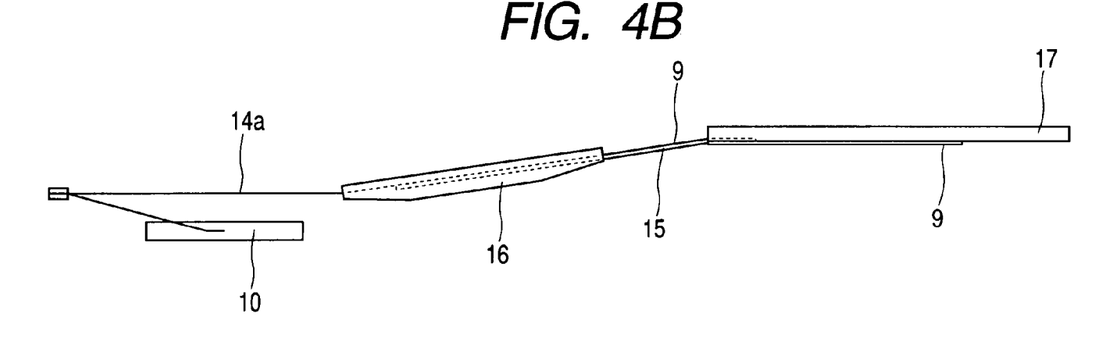

FIGS. 4A and 4B show the details of the magnetic head support mechanism 1 of the present embodiment. FIG. 4A is its top view and FIG. 4B is its side view. The magnetic head 10 includes the core 11, the coil 12 which is provided around the core 11, the slider 13 on which the core 11 and the coil 12 are mounted. The core 11 is made of a magnetic material, and the end face of the core 11 is formed so as to be opposite to the magneto-optical recording medium 4. The slider 13 is made of such a material as resin and ceramic having lubricity.

The magnetic head 10 is held at front ends of the pair of gimbals 14a and 14b, the gimbals 14a and 14b are held with the magnetic head 10 by the suspension 15, and the suspension 15 is attached to the holding substrate 17. The gimbals 14a and 14b and the suspension 15 are connected to be reinforced by the reinforcing member 16 while the gimbals 14a and 14b and the suspension 15 are electrically insulated from each other. The magnetic head support mechanism 1 is connected to the optical head 2 by attaching the holding substrate 17 to the connecting member 3.

For example, each of the gimbals 14a and 14b is a U-shaped thin plate having a thickness ranging from 30 to 50 μm and a width ranging from 0.2 to 0.6 mm, and the gimbals 14a and 14b are made of phosphor bronze or beryllium copper having elasticity. For example, the suspension 15 is a U-shaped thin plate having a thickness ranging from 40 to 70 μm and a width ranging from 4 to 12 mm. The suspension 15 is made of stainless steel having the elasticity, and the holding substrate 17 is made of stainless steel. The reinforcing member 16 is made of a resin material, and formed by inserting the gimbals 14a and 14b and the suspension 15 into the resin material and molding it.

One end of each of the gimbals 14a and 14b is electrically connected to both ends of the coil 12 in the magnetic head 10, respectively. In the suspension 15 and the holding substrate 17, providing paths M1 and M2 having a concave notch are formed at the position where the suspension 15 and the holding substrate 17 are attached to each other. The electric leads 9 extend to one end of the reinforcing member 16 along and on the surface of the suspension 15 while passing through the providing paths M1 and M2. The other end of each of the gimbals 14a and 14b is electrically connected to the electric leads 9 at the exposed portion of a depression R3 formed in the other end of the reinforcing member 16. Even in the present embodiment, the gimbals 14a and 14b form the current supply path for supplying the current to the coil 12, while the suspension 15 does not form the current supply path.

At this point, the connection of the suspension 15 to the holding substrate 17 should be quite strong, and its manufacture should be also easy. Therefore, the suspension 15 comes into close contact with the lower surface of the holding substrate 17, and the suspension 15 is integrally contacted to the holding substrate 17 by the spot welding. Alternately, the connection may be performed by contact bonding such as caulking. Since it is not necessary that the suspension 15 is electrically insulated from the holding substrate 17, unlike the first embodiment, the insulating member used in the first embodiment is not required.

As shown in FIG. 1, the suspension 15 is downwardly bended toward the opening W in the cartridge 6 at the position where the suspension 15 is attached to the holding substrate 17, and the energization force of the bending causes the magnetic head 10 to load (press) onto the magneto-optical recording medium 4 within the opening W. The magnetic head 10 is unloaded (retracted) from the magneto-optical recording medium 4 in such a manner that the driving member 7 is slidingly driven in a direction shown by the arrow A and abutted on the reinforcing member 16 to lift the reinforcing member 16, the suspension 15 is elastically deformed, and the magnetic head support mechanism 1 is rotated as shown by the arrow B.

In the opening W of the cartridge 6, the optical head 2 is arranged on the lower surface side of the magneto-optical recording medium 4, and the magnetic head 10 is loaded (pressed) to the upper surface side of the magneto-optical recording medium 4 while the magnetic-head 10 is opposite to the optical head 2. At this point, the magnetic head support mechanism 1 is downwardly tilted toward the inside of the opening W from a position above the upper surface of the cartridge 6. The relative positions of the magnetic head support mechanism 1 and the optical head 2 are adjusted so that the center of the end face of the core 11 which is a magnetic field generating portion is located on the optical axis Z of the objective lens 5 in the optical head 2 (at the position of the light beam spot formed on the magneto-optical recording medium 4), and in this state the mechanism 1 and the head 1 are connected by the connecting member 3.

The current from the magnetic head driving circuit 8 is supplied to the coil 12 in the magnetic head 10 through the electric lead 9 and the gimbals 14a and 14b. When the support members themselves of the magnetic head 10 are used as the current supply path, it is not necessary to provide and fix the electric leads along the gimbals 14a and 14b or to directly connect the electric leads to the magnetic head 10. Accordingly, the rigidity of the electric leads 9 does not adversely affects mechanical characteristics of the support members, particularly the gimbals 14a and 14b. Even when the gimbals 14a and 14b have the narrow width and the U-shape, it is easy to stably realize the desired minute mechanical characteristics, and it is also easy to realize its manufacture.

By forming the gimbals 14a and 14b with the thin and narrow member, the magnetic head 10 is elastically held sufficiently in the vertical direction. The horizontal displacement of the magnetic head 10 associated with vertical displacement of the magnetic head 10 is suppressed to a minimum by the method in which the tilt amount of the gimbals 14a and 14b is sufficiently decreased relative to the magneto-optical recording medium 4. The vertical displacement of the magnetic head 10 is generated by the fluctuation in height of the surface of the magneto-optical recording medium 4, the surface run-out of the magneto-optical recording medium 4, or the like.

The U-shaped folded portion having the reverse tilt can be also caused to have an effect of further decreasing the horizontal displacement generated by a whole of the support members in such a manner that the folded portion has a function of canceling the horizontal displacement associated with the rotational displacement generated by a forward portion or the suspension 15. Since the gimbals 14a and 14b have also the function of the current supply path to the coil 12, it is suitable that the gimbals 14a and 14b are made of a copper alloy having low electric resistivity, particularly phosphor bronze or beryllium copper. Such a material can be soldered to the coil 12 or the electric leads 9, so that productivity is good.

By forming the suspension 15 with a member thicker and wider than the gimbals 14a and 14b, the rigidity higher than the gimbals 14a and 14b can be given to the suspension 15. As a result, the deformation hardly occurs against vibration and impact applied to the magneto-optical recording apparatus from the outside or the displacement of the magneto-optical recording medium 4, and the rotational displacement of the support members which is the cause of the horizontal displacement of the magnetic head 10 can be suppressed.

Therefore, in particular it is desirable that the suspension 15 is made of stainless steel or spring steel having mechanical strength (tensile strength) superior to the copper alloy forming the gimbals 14a and 14b, and the suspension 15 and the holding substrate 17 can be fixedly connected to each other by the spot welding when makes the holding substrate 17 is made of the same material as or the material similar to the suspension 15.

Although, the stainless steel or the spring steel has the electric resistivity higher than that of the copper alloy constituting the gimbals 14a and 14b, and the soldering can not be performed, there is no problem because the suspension 15 is not the current supply path to the coil 12. The connection may be performed by the contact bonding such as the caulking, when the suspension 15 differs from the holding substrate 17 in the composition of the constituent material and the spot welding can not be performed.

As described above, the characteristic of the gimbals 14a and 14b minimizing electric power loss in the current supply while sufficiently elastically holding the magnetic head 10 can be compatible with the characteristic of the suspension 15 suppressing the displacement due to the vibration and impact applied from the outside and the rotational displacement, although both characteristics are different form each other, by forming the gimbals 14a and 14b with a different member from the suspension 15 and differentiating the gimbals from the suspensions in rigidity (thickness and constituent material) according to each required characteristic. As a result, the horizontal displacement of the magnetic head 10 associated with the displacement in the vertical direction can be sufficiently decreased, similarly to the action of the first embodiment described in FIG. 5.

In the present embodiment, since the insulating member holding the upper and lower surfaces of the suspension 15 is not required, the height in the magnetic head support mechanism 1 can be decreased. Further, when the height itself (position of flexed portion) for attaching the suspension 15 is decreased, the tilt of the suspensions 15 can be decreased, so that the horizontal displacement of the magnetic head 10 associated with the rotational displacement can be further decreased.

Similarly to the second embodiment, when the connection position between the gimbals 14a and 14b and the electric leads 9 is provided near the position where the suspensions 15a and 15b are mounted to the holding substrate 17, it is necessary that the magnetic head support mechanism 1 is manufactured under the strict management of the height so that the solder for connection is not upwardly projected from the holding substrate 17, or in consideration of the projection of the solder, it is necessary that a profile of the magnetic head support mechanism 1 is increased by providing sufficient clearance on the holding substrate 17 in order to prevent the contact. However, in the present embodiment, the connection position between the gimbals 14a and 14b and the electric leads 9 is located on the reinforcing member 16 apart from the holding substrate 17, so that there is no fear that the solder is upwardly projected from the holding substrate 17 and it is easy to minimize the thickness of the magnetic head support mechanism 1.

As described above, according to the present invention, the characteristic of the gimbals sufficiently elastically holding the magnetic head can be compatible with the characteristic of the suspension suppressing the rotational displacement, although both characteristics are different from each other, by forming the suspension with a high-rigid member different from the gimbals. Accordingly, when the magnetic head is displaced by the vibration or the impact from the outside or the surface of the magneto-optical recording medium is displaced in the vertical direction, the horizontal displacement associated with the displacement of the magnetic head or the magneto-optical recording medium can be decreased, so that the spot of the light beam can be formed within the area to which the magnetic field is applied, even if the size of the end face of the core in the magnetic head is decreased. As a result, the inductance of the magnetic head can be decreased and recording speed of the information signal in the magneto-optical recording apparatus can be improved.

Further, when the gimbals forms the current supply path for supplying the current to the coil of the magnetic head and the suspension does not form the current supply path, since the insulating member which electrically insulates the suspension from the holding substrate is not required, the suspension can be fixedly connected to the holding substrate by the contact bonding such as the caulking or the spot welding so that the suspension comes into close contact with the holding substrate. As a result, the height in the magnetic head support mechanism can be decreased, and the tilt of the suspension can be decreased by lowering the height itself for attaching the suspension 15, so that the horizontal displacement of the magnetic head associated with the rotational displacement can be further decreased.

What is claimed is:

1. A magnetic head support mechanism comprising:
   a magnetic head;
   gimbals for electrically connecting to the magnetic head, wherein the gimbals are made of a copper alloy and form a current supply path; and
   a suspension for holding the gimbals, wherein the suspension is a member made of stainless steel or spring steel and has a rigidity higher than that of the gimbals, and wherein the suspension performs a load (press)/unload (retract) operation of the magnetic head on a recording medium by elastic deformation of the suspension.

2. A magnetic head support mechanism according to claim 1, wherein the suspension is formed by a plate member thicker than the gimbals.

3. A magnetic head support mechanism according to claim 1, wherein the suspension does not form the current supply path to the magnetic head.

4. A magneto-optical recording apparatus comprising:
   a magnetic head support mechanism according to claim 1; and
   an optical head which irradiates a magnetic field applying region of the recording medium, to which a magnetic field generated by the magnetic head of the magnetic head support mechanism is applied, with a light beam.

* * * * *

UNITED STATES PATENT AND TRADEMARK OFFICE
CERTIFICATE OF CORRECTION

| | |
|---|---|
| PATENT NO. | : 7,333,402 B2 |
| APPLICATION NO. | : 10/760317 |
| DATED | : February 19, 2008 |
| INVENTOR(S) | : Kazuyoshi Ishii et al. |

It is certified that error appears in the above-identified patent and that said Letters Patent is hereby corrected as shown below:

COLUMN 6

Line 59, "affects" should read --affect--.

COLUMN 9

Line 29, "affects" should read --affect--; and
Line 53, "portion or" should read --portion of--.

COLUMN 10

Line 40, "form" should read --from--.

COLUMN 12

Line 7, "magnetic-head 10" should read --magnetic head 10--;
Line 18, "head 1" should read --head 2--; and
Line 28, "affects" should read --affect--.

COLUMN 13

Line 6, "makes" should be deleted;
Line 9, "Although," should read --Although--; and
Line 24, "form" should read --from--.

Signed and Sealed this

Thirtieth Day of September, 2008

JON W. DUDAS
*Director of the United States Patent and Trademark Office*